United States Patent
Tanemura et al.

(10) Patent No.: US 11,906,045 B2
(45) Date of Patent: Feb. 20, 2024

(54) ACTUATOR CONTROL DEVICE

(71) Applicant: DENSO CORPORATION, Kariya (JP)

(72) Inventors: Satoko Tanemura, Kariya (JP); Seiji Nakayama, Kariya (JP); Akihiro Harada, Kariya (JP); Haruka Miyano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/302,373

(22) Filed: Apr. 18, 2023

(65) Prior Publication Data

US 2023/0341048 A1 Oct. 26, 2023

(30) Foreign Application Priority Data

Apr. 20, 2022 (JP) ................................ 2022-069566

(51) Int. Cl.
*F16H 61/32* (2006.01)
*F16H 59/10* (2006.01)

(52) U.S. Cl.
CPC ........... *F16H 61/32* (2013.01); *F16H 59/105* (2013.01); *F16H 2061/326* (2013.01); *F16H 2710/22* (2013.01)

(58) Field of Classification Search
CPC .. F16H 61/32; F16H 59/105; F16H 2061/326; F16H 2710/22
USPC .......................................................... 701/51
See application file for complete search history.

(56) References Cited

U.S. PATENT DOCUMENTS

| 10,522,072 | B2* | 12/2019 | Wright ................... H05K 1/115 |
| 10,781,918 | B2* | 9/2020 | Kamio .................... F16H 61/02 |
| 11,774,000 | B2* | 10/2023 | Aikawa ............... F15B 13/0825 |
| | | | 137/884 |
| 2019/0360581 | A1 | 11/2019 | Kamio |
| 2020/0011414 | A1 | 1/2020 | Sakaguchi |

FOREIGN PATENT DOCUMENTS

JP 4844338 B2 10/2011

\* cited by examiner

*Primary Examiner* — Colby M Hansen
(74) *Attorney, Agent, or Firm* — Nixon & Vanderhye P.C.

(57) ABSTRACT

A control device switches a shift range by driving a motor and moving a detent roller in a parking lock system including an electric actuator having the motor and a detent mechanism. A control unit of the control device includes a drive control part, a position determination part and a range determination part. The drive control part controls driving of the motor. When the detent roller is moved to a target valley portion corresponding to the target range, a position determination part determines that the detent roller has passed over a peak portion based on sensor information. The range determination part is configured to estimate that the detent roller has reached the range of the target range corresponding to the target range at a peak passing over determination timing when it is determined that the detent roller has passed over the peak portion.

10 Claims, 11 Drawing Sheets

ACTUATOR CONTROL DEVICE

CROSS REFERENCE TO RELATED APPLICATION

The present application is based on Japanese Patent Application No. 2022-69566 filed on Apr. 20, 2022, disclosure of which is incorporated herein by reference.

TECHNICAL FIELD

The present disclosure relates to an actuator control device.

BACKGROUND

Conventionally, a shift-by-wire system is a system that electrically controls a shift range switching mechanism of an automatic transmission.

SUMMARY

An actuator control device in the present disclosure is capable of improving responsiveness.

In a drive system including an actuator having a drive source and a detent mechanism, an actuator control device of the present disclosure controls a switching of a shift range in order to drive the actuator and move an engaging member. The detent mechanism has a detent member and the engaging member. The detent member is formed with a plurality of valley portions and peak portions separating the valley portions. The engaging member is capable of moving between the valley portions by driving an output shaft by the actuator.

DETAILED DESCRIPTION

In an assumable example, a shift-by-wire system is a system that electrically controls a shift range switching mechanism of an automatic transmission. For example, a detent roller is controlled so as to stop within a range of play when the detent roller fits in a center of a recess portion according to a target shift range.

Since the shift range is switched by hydraulic pressure, it is necessary to reliably fall the detent roller to a position of a valley. For example, when a hydraulic mechanism is not required, such as a brake-by-wire system that switches between P range and notP range, even if the detent roller does not fall to a bottom of the valley, it may still function satisfactorily.

The present disclosure has been made in view of the above-mentioned problems, and an actuator control device in the present disclosure is capable of improving responsiveness.

In a drive system including an actuator having a drive source and a detent mechanism, an actuator control device of the present disclosure controls a switching of a shift range in order to drive the actuator and move an engaging member. The detent mechanism has a detent member and the engaging member. The detent member is formed with a plurality of valley portions and peak portions separating the valley portions. The engaging member is capable of moving between the valley portions by driving an output shaft by the actuator.

The actuator control device includes a drive control part, a position determination part, and a range determination part. The drive control part controls a drive of the actuator. The position determination part determines, based on sensor information, that the engaging member has passed over the peak portion when moving the engaging member to a target valley portion corresponding to the target range. The range determination part estimates that the engaging member has reached the target range corresponding to the target range at a peak passing over determination timing, which is the timing at which it is determined that the engaging member has passed over the peak portion. As a result, when switching the shift range, range determination can be performed quickly, and responsiveness can be improved.

Hereinafter, an actuator control device according to the present disclosure will be described with reference to the drawings. Hereinafter, in a plurality of embodiments, a substantially equivalent configuration will be denoted by an identical reference, and explanation thereof will be omitted.

First Embodiment

Figure 1:
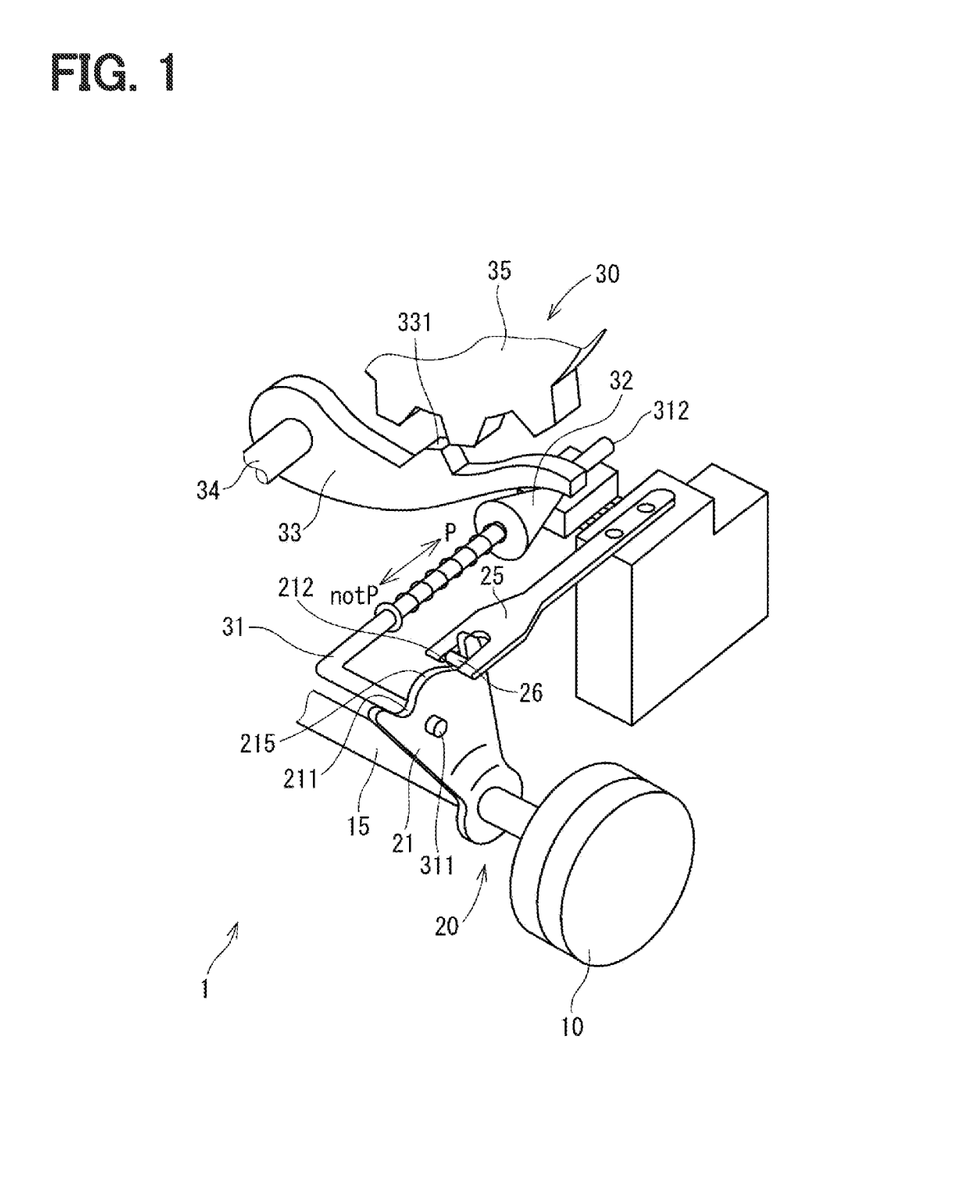
FIG. 1 is a schematic configuration diagram showing a parking lock system according to a first embodiment.

A first embodiment will be described based on FIGS. 1 to 5. As shown in FIG. 1, an electric actuator 10 is applied to a parking lock system 1. The parking lock system 1 includes an electric actuator 10, a detent mechanism 20 and a parking lock mechanism 30. The electric actuator 10 is of a rotary type and is composed of, for example, a brushed DC motor, a reduction gear mechanism and the like. The electric actuator 10 drives the detent mechanism 20 by rotating an output shaft 15.

The detent mechanism 20 has a detent plate 21, a detent spring 25 and the like, and transmits rotational driving force output from the electric actuator 10 to the parking lock mechanism 30.

The detent plate 21 is fixed to the output shaft 15 and driven by the electric actuator 10. On the detent spring 25 side of the detent plate 21, two valley portions 211 and 212 and a peak portion 215 separating the two valley portions 211 and 212 are provided.

The detent spring 25, which is an urging member, is an elastically deformable plate-like member, and is provided with a detent roller 26 at a tip of the detent spring 25. The detent spring 25 urges the detent roller 26 toward a rotation center of the detent plate 21.

When a rotational force equal to or greater than a predetermined force is applied to the detent plate 21, the detent spring 25 is elastically deformed, and the detent roller 26 moves between the valley portions 211 and 212. By fitting the detent roller 26 into one of the two valley portions 211 and 212, the swinging of the detent plate 21 is restricted, and a state of the parking lock mechanism 30 is fixed.

The parking lock mechanism 30 includes a parking rod 31, a conical member 32, a parking lever 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into the valley portion 211 corresponding to the P range, the conical member 32 moves in the direction of the arrow P.

The parking lever 33 comes into contact with a conical surface of the conical member 32 and is provided so as to be swingable around the shaft part 34. On the parking gear 35 side of the parking lever 33, a protrusion 331 that can mesh with the parking gear 35 is provided. When the conical member 32 moves in the direction of the arrow P due to the rotation of the detent plate 21, the parking lever 33 is pushed up and the protrusion 331 and the parking gear 35 mesh with each other. On the other hand, when the conical member 32 moves in the direction of the arrow notP, the meshing between the protrusion 331 and the parking gear 35 is released.

The parking gear 35 is connected to a drive shaft (not shown) and provided so as to be able to mesh with a protrusion 331 of the parking lever 33. When the parking gear 35 and the protrusion 331 are engaged with each other, the rotation of the drive shaft is restricted. When the shift range is one of the ranges (not P range) other than the P range, the parking gear 35 is not locked by the parking lever 33. Therefore, the rotation of the drive shaft is not restricted by the parking lock mechanism 30. When the shift range is the P range, the parking gear 35 is locked by the parking lever 33 and the rotation of the drive shaft is restricted.

Hereinafter, the valley portion 211 into which the detent roller 26 is fitted when the shift range is the P range is referred to as "P valley", the valley portion 212 into which the detent roller 26 is fitted when the shift range is the notP range is referred to as "notP valley", and the valley bottoms of the valley portions 211, 212 are referred to as "lowest part".

Figure 2:
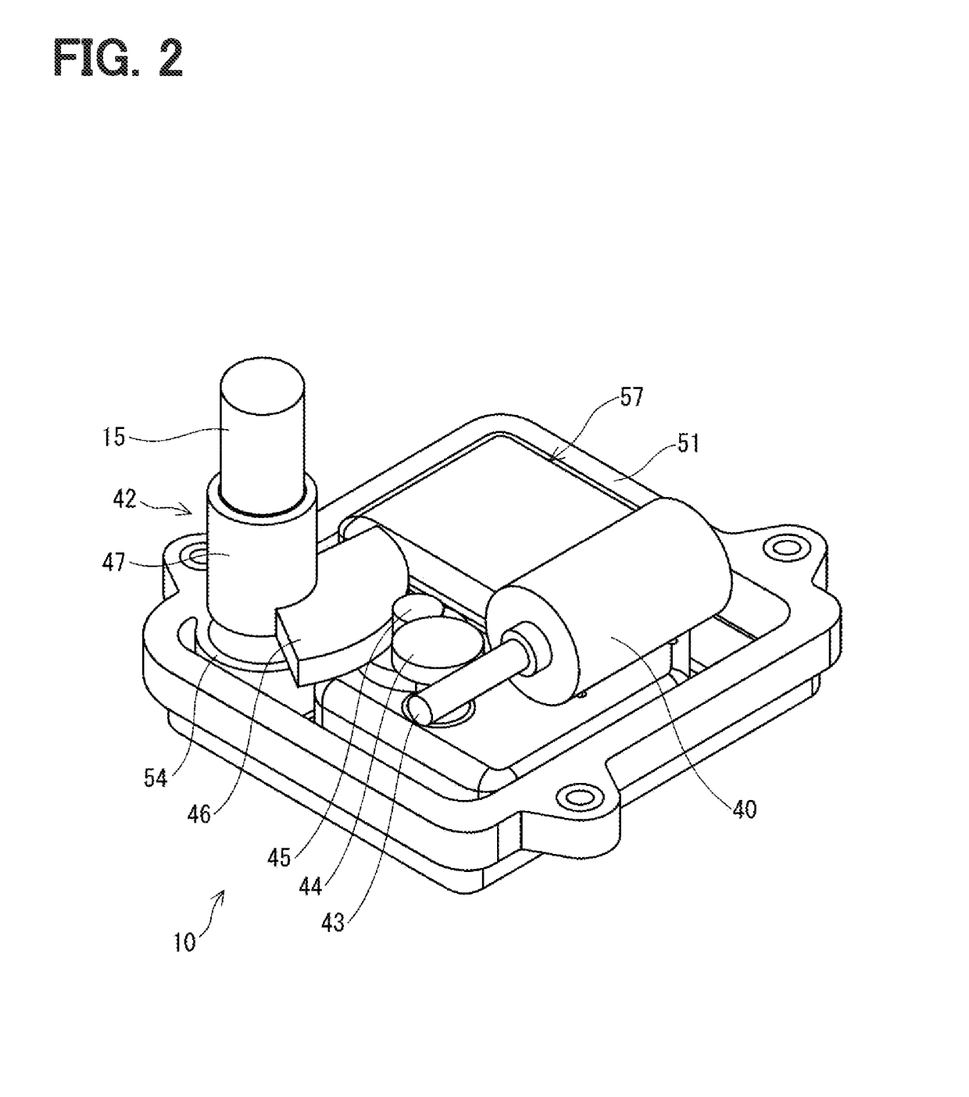
FIG. 2 is a perspective view showing an electric actuator according to the first embodiment.

As shown in FIG. 2, the electric actuator 10 has a motor 40, a speed reduction mechanism 42, a case 51, a board cover 57, and the like. The motor 40 is placed horizontally on the board cover 57 so that the motor shaft is substantially parallel to the bottom surface of the case 51.

The speed reduction mechanism 42 has a worm gear 43, a helical gear 44, an intermediate gear 45, a driven plate 46 and a driven shaft 47. The worm gear 43 rotates together with the motor shaft of the motor 40. The helical gear 44 meshes with the large diameter portions of the worm gear 43 and the intermediate gear 45. The intermediate gear 45 has a large diameter portion and a small diameter portion, the large diameter portion is meshed with the helical gear 44 and the small diameter portion is meshed with the driven plate 46.

The driven plate 46 and the driven shaft 47 are integrally formed, but may be formed separately. The driven shaft 47 and the output shaft 15 are connected by a spline joint. Thereby, the rotation of the motor 40 is transmitted to the output shaft 15 via the worm gear 43, the helical gear 44, the intermediate gear 45, the driven plate 46, and the driven shaft 47.

The case 51 is made of, for example, resin, and has a tubular portion 54 formed at a location corresponding to the driven shaft 47. The tubular portion 54 is formed in a cylindrical shape that opens toward the driven shaft 47, and is provided so that the end surface thereof can come into contact with the driven shaft 47. Due to the contact between the driven shaft 47 and the tubular portion 54, the load in the axial direction of the driven shaft 47 is applied to the tubular portion 54.

The driven shaft 47 is provided with a sensor magnet (not shown). A position sensor 55 (see FIG. 3) is provided inside the tubular portion 54 at a location facing the driven shaft 47. In the present embodiment, the driven shaft 47 is used as a "sensor shaft" and the position sensor 55 detects the rotational position of the output shaft 15. The board cover 57 is fixed to the case 51 and has a board (not shown) provided therein. Various electronic components constituting the control device 60 are mounted on the board.

Figure 3:
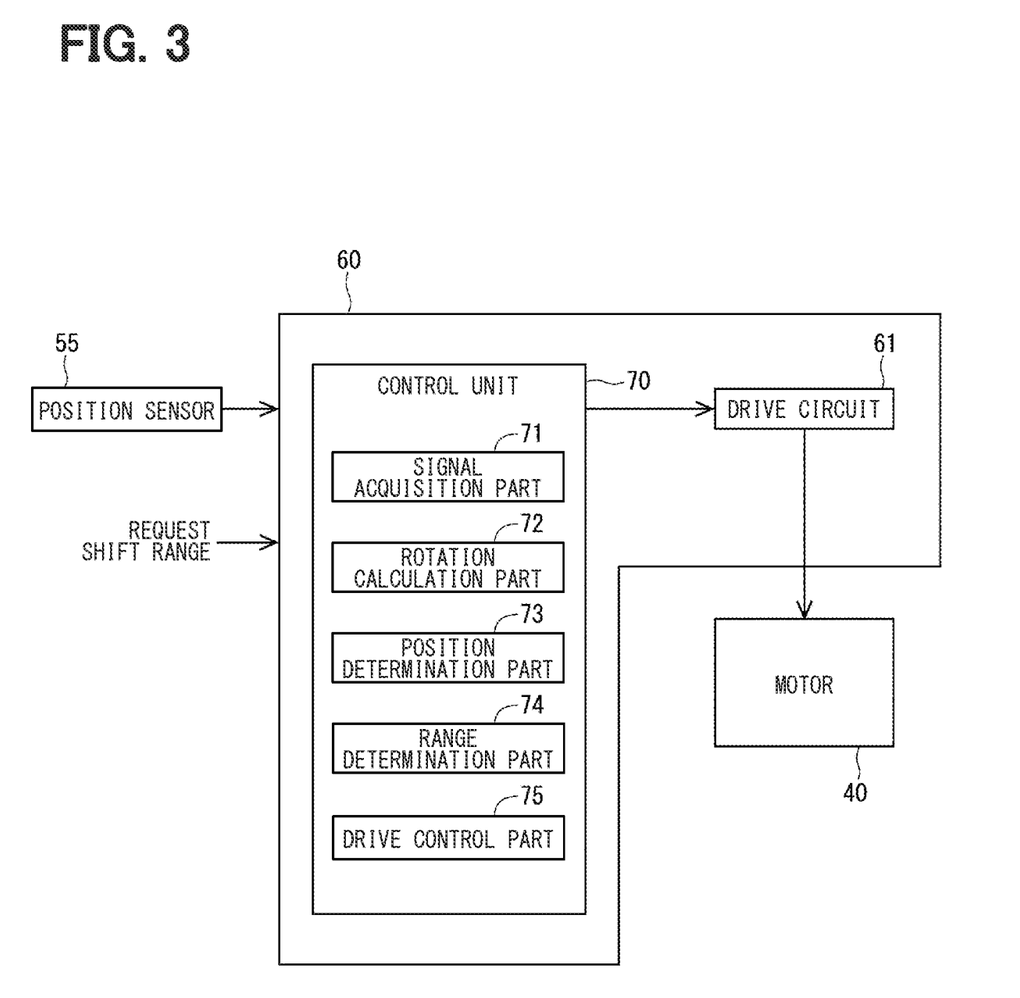
FIG. 3 is a block diagram showing a control unit according to the first embodiment.

As shown in FIG. 3, the control device 60 has a drive circuit 61, a control unit 70, and the like. The drive circuit 61 has drive elements (not shown). The control unit 70 is mainly composed of a microcomputer and the like, and internally includes, although not shown in the figure, a CPU, a ROM, a RAM, an I/O, a bus line for connecting these components, and the like. Each processing executed by each of the control unit 50 may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit.

The control unit 70 acquires the required shift range, sets the target range, and controls the driving of the electric actuator 10 so that the detent roller 26 is positioned in the valley portions 211 and 212 corresponding to the target range. The control unit 70 has, as functional blocks, a signal acquisition part 71, a rotation calculation part 72, a position determination part 73, a range determination part 74, a drive control part 75, and the like. The signal acquisition part 71 acquires a position detection signal from the position sensor 55, a signal related to the required shift range from a host ECU (not shown), sensor signals related to the current, voltage, temperature, etc. of the motor 40, and the like.

The rotation calculation part 72 calculates a sensor angle θs, which is the rotation angle of the driven shaft 47, and a sensor rotation speed Ns, which is the rotation speed of the driven shaft 47, based on a detection value of the position sensor 55. The sensor angle θs and the sensor rotation speed Ns can be regarded as values relating to the output shaft 15 when the driven shaft 47 and the output shaft 15 are rotating in a state where the backlash is eliminated.

The position determination part 73 determines the position of the detent roller 26 in the detent mechanism 20. The range determination part 74 determines the current shift range. The drive control part 75 controls the driving of the motor 40 by controlling the ON/OFF operation of the drive elements of the drive circuit 61.

Figure 5:
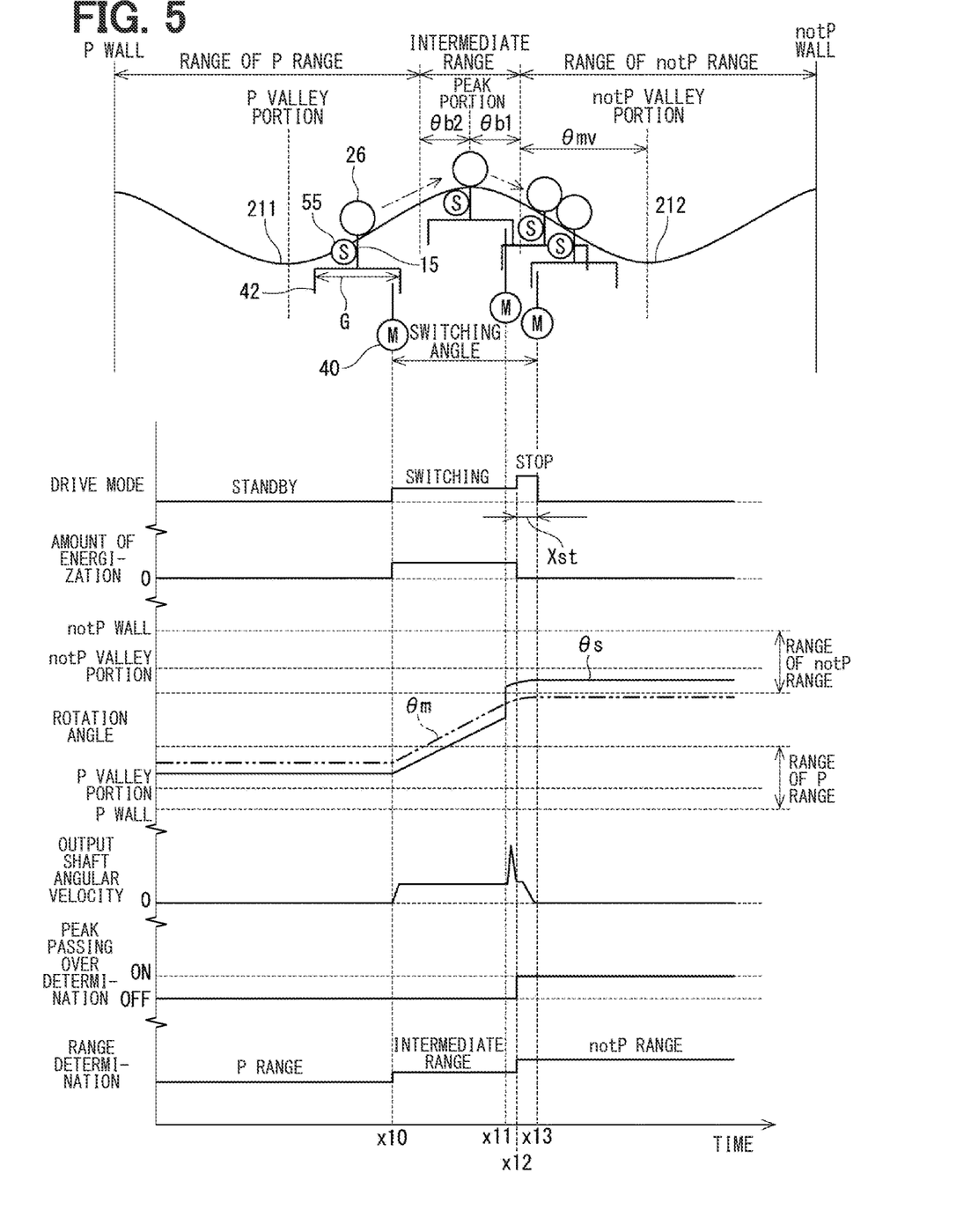
FIG. 5 is a schematic diagram and a time chart for explaining the switching processing according to the first embodiment.

A upper row of FIG. 5 schematically shows a play between the motor 40 and the output shaft 15, and shows how the detent roller 26 moves along the valley portions 211 and 212, in a state where the horizontal direction of the page is regarded as the rotation direction. In practice, the detent roller 26 moves between the valley portions 211 and 212 by rotating the detent plate 21 that rotates integrally with the output shaft 15. In the present embodiment, the position sensor 55 is provided at a position for detecting the rotation of the driven shaft 47, but in order to avoid complication, the position sensor 55 is described as detecting the rotational position of the output shaft 15, in FIG. 5 and the like. In addition, the operation of the motor, etc, is indicated by a dashed-dotted arrow.

Also, the total play between the motor shaft and the output shaft 15 is defined as backlash G, an angle formed between an apex of the peak portion 215 and one end on the apex side in the not P range is defined as intermediate range angle θb1, and an angle formed between the apex of the peak portion 215 and one end on the apex side in the P range is defined as intermediate range angle θb2. A range of the notP range is set to a range in which the parking lock mechanism 30 can be reliably released, and a determination range of the P range is set to a range in which the parking lock mechanism 30 can be reliably operated. The angle formed between the apex of the peak portion 215 and the valley portions 211 and 212 is defined as a peak-to-valley angle θmv. In FIG. 5, the description of the peak-to-valley angle θmv on the valley portion 211 side is omitted. The peak-valley angle θmv may be the same or different on the P range side and on the not P range side.

The electric actuator 10 of the present embodiment is applied to the parking lock system 1 that switches between the P range and the notP range, and does not have a hydraulic mechanism. Therefore, the parking lock mechanism 30 can function properly without necessarily dropping the detent roller 26 to the bottom of the valley portion.

Further, in the present embodiment, the backlash G is formed larger than the intermediate range angles θb1 and θb2 and smaller than the peak-to-valley angle θmv. Therefore, when the output shaft 15 rotates within the range of the backlash G after the detent roller 26 has passed over the peak portion 215, the output shaft 15 is positioned within the range of the P range or the range of the not P range. Therefore, in the present embodiment, when it is determined that the detent roller 26 has passed over the peak portion 215, it is determined that the range has switched.

The switching processing of the present embodiment will be described based on the flowchart of FIG. 4. The processing in FIG. 4 and the like is executed by the control unit 70 at a predetermined cycle. Hereinafter, "step" in step S101 is omitted, and is simply referred to as a symbol "S".

In S101, the control unit 70 determines whether or not a driving mode is a standby mode. When it is determined that the driving mode is not the standby mode (NO in S101), the process proceeds to S106. If it is determined that the driving mode is the standby mode (YES in S101), the process proceeds to S102.

In S102, the control unit 70 determines whether the target range has been switched. When it is determined that the target range has not been switched (NO in S102), the standby mode is continued. When it is determined that the target range has been switched (YES in S102), the process proceeds to S103. In S103, the position determination part 73 turns off the peak passing over determination flag Fmj. In S104, the control unit 70 sets the driving mode to the switching mode. In S105, the drive control part 75 turns on power to the motor 40.

In S106, the control unit 70 determines whether or not the driving mode is the switching mode. When it is determined that the driving mode is not the switching mode (NO in S106), the process proceeds to S111. When it is determined that the driving mode is the switching mode (YES in S106), the process proceeds to S107.

In S107, the position determination part 73 determines whether or not the peak passing over determination flag Fmj is on. The control unit 70 determines whether or not the detent roller 26 has passed over the peak portion 215 by a position determination process separate from this process, and when it is determined that the detent roller 26 has passed over the peak portion 215, the peak passing over determination flag Fmj is turned on.

When the detent roller 26 passes over the peak portion 215, the output shaft 15 is advanced by the spring force of the detent spring 25. As a result, the load torque is reversed, and the backlash G is suddenly minimized on the opposite side, so that the detection value of the position sensor 55 sharply fluctuates. Therefore, in the present embodiment, when an angle change amount Δθ, which is an absolute value of the difference between the previous value and the current value of the sensor angle θs, is equal to or greater than a sudden change determination threshold value θth, it is determined that the detent roller 26 has passed over the peak portion 215, and the peak passing over determination flag Fmj is turned on. The peak passing over determination may be performed by a method other than the one exemplified here.

When it is determined that the peak passing over determination flag Fmj is off (NO in S107), the detent roller 26 is in a state of climbing the peak, and the current drive state is continued. When it is determined that the peak passing over determination flag Fmj is ON (YES in S107), the process proceeds to S108. The control unit 70 changes the drive mode to the stop mode in S108, and turns off the power supply to the motor 40 in S109. In the stop mode, braking force is generated by circulating back electromotive force. Also, in S110, the range determination part 74 sets the current range as the target range.

In S111 to which the drive mode is determined not to be the switching mode (NO in S106), the control unit 70 determines whether or not the drive mode is the stop mode. When it is determined that the drive mode is not the stop mode (NO in S111), the processes after S112 are skipped. When it is determined that the drive mode is the stop mode (YES in S111), the process proceeds to S112.

In S112, the control unit 70 determines whether or not the stop determination time Xst has elapsed after transitioning to the stop mode. When it is determined that the stop determination time Xst has not elapsed (NO in S112), the stop control counter that counts the elapsed time after transitioning to the stop mode is incremented. When it is determined that the stop determination time Xst has elapsed (YES in S112), the process proceeds to S113, and the drive mode is set to the standby mode. It also resets the stop control counter.

The switching processing of the present embodiment will be described based on the time chart of FIG. 5. Here, the target range is assumed to be the notP range, and switching from the P range to the notP range will be described as an example. In FIG. 5, the schematic diagram showing the drive state of the detent mechanism 20 is shown in the upper row, and the time chart is shown in the lower row. In the time chart, the common time axis is taken as the horizontal axis, and from the top, the drive mode, the amount of energization, the rotation angle, the output shaft angular velocity, the peak passing over determination flag Fmj, and the range determination are shown.

The sensor angle θs based on the detection value of the position sensor 55 is indicated by a solid line, the motor angle θm corresponding to the behavior of the motor 40 is indicated by a two-dot chain line, and the scales are aligned by gear ratio conversion. Also, the motor angle when the detent roller 26 is at the bottom of the valley portion 211 is defined as "P", the motor angle when the detent roller 26 is at the bottom of the valley portion 212 is defined as "notP". The drive limit of the detent roller 26 on the P range side is defined as "P wall", and the drive limit thereof on the not P range side is defined as "P wall". The same applies to FIG. 7 and the like.

At time x10, when the target shift range switches from the P range to the notP range, the drive mode is changed from the standby mode to the switching mode, and the motor 40 is driven. When the motor 40 is driven, the detent roller 26 moves toward the top of the peak portion 215 in a state where the backlash is eliminated in the traveling direction side. Also, the range determination is set from the P range to the intermediate range.

At time x11, when the detent roller 26 passes over the peak portion 215, the torque is applied in the opposite direction, and the backlash is formed in the traveling direction, and eliminates at once on the opposite side. In the present embodiment, since the backlash G is formed to be greater than the intermediate range angle θb1, the output shaft 15 moves within the range of the backlash G to reach the notP range.

At time x12 at which it is determined that the detent roller 26 has passed over the peak portion 215, the peak crossing over determination flag Fmj is turned on, and the range determination is set to the notP range. Also, the drive mode is set to the stop mode, and the power supply to the motor 40 is turned off. At the time x13 when the stop determination time Xst has passed from starting the stop mode, the drive mode is set to the standby mode. As in the present embodiment, when the driven torque is relatively large, if the motor 40 is turned off on the way from the peak portion 215 to the valley portion 212, the detent roller 26 does not fall to the bottom of the valley portion and stops in the middle of the downward slope.

In the present embodiment, since there is a spline play between the driven shaft 47, which is the sensor shaft, and the output shaft 15, the detent roller 26 crosses over the peak portion 215 and the backlash is reversed so that the sensor angle θs changes suddenly. By detecting this sudden change, it can be determined that the detent roller 26 has passed over the peak portion 215. Further, in the present embodiment, since the backlash G is formed to be larger than the intermediate range angles θb1 and θb2, when the detent roller 26 passes over the peak portion 215, the output shaft 15 moves within the range of the backlash G, so that the output shaft is positioned within the target range. Therefore, when a sudden change in the sensor angle θs due to the detent roller 26 passing over the peak portion 215 is detected, it can be determined that the range has been switched to the target range. As a result, range determination can be performed quickly.

Further, since the driven torque of the electric actuator 10 is large, the detent roller 26 is within the notP range and stops at the peak portion 215 side with respect to the bottom of the valley portion 212. As a result, compared with the case where the detent roller 26 is moved to the bottom of the valley portion, the switching angle is small, so the responsiveness can be improved.

As described above, the control device 60 switches the shift range by driving the motor 40 and moving the detent roller 26 in the parking lock system 1 including the electric actuator 10 having the motor 40 and the detent mechanism 20.

The detent mechanism 20 has a detent plate 21 and a detent roller 26. The detent plate 21 is formed with a plurality of valley portions 211 and 212 and a peak portion 215 separating the valley portions 211 and 212. The detent roller 26 can move between the valley portions 211 and 212 by driving the output shaft 15 by the electric actuator 10.

The control unit 70 of the control device 60 includes a drive control part 75, a position determination part 73 and a range determination part 74. The drive control part 75 controls driving of the motor 40. When the detent roller 26 is moved to the target valley portion corresponding to the target range, the position determination part 73 determines that the detent roller 26 has passed over the peak portion 215 based on sensor information. The sensor information in the present embodiment is information from the position sensor 55, but the peak passing over determination may be performed based on information other than the position sensor 55, such as a current sensor and the like.

The range determination part 74 can estimate that the detent roller 26 has reached the range of the target range corresponding to the target range at the peak passing over determination timing when it is determined that the detent roller 26 has passed over the peak portion 215. As a result, when switching the shift range, it is possible to quickly determine the range.

The range determination part 74 determines that the current range is the target range at the peak passing over determination timing. The drive control part 75 starts stop control to stop the motor 40 at the timing of passing over the peak portion. As a result, the range determination is performed before the detent roller 26 reaches the bottom of the valley portion, so responsiveness can be improved.

The backlash G, which is the total play provided between the motor 40 and the output shaft 15, is larger than the angle between the peak of the peak portion 215 and the range of the range determination, and less than the angle between the peak of the peak portion 215 and the bottom of the valley portions 211, 212. By forming the backlash G to be larger than the angle between the peak of the peak portion 215 and the range of the range determination, when the detent roller 26 passes over the peak portion 215, the output shaft 15 rotates within the range of the backlash G. Therefore, since the detent roller 26 can be moved within the range of the range determination, the range determination can be appropriately performed at the timing when the detent roller 26 passes over the peak portion. Further, by forming the backlash G to be smaller than the peak-to-valley angle θmv, even if the output shaft 15 rotates within the range of the backlash G when the detent roller 26 passes over the peak portion, the detent roller 26 does not reach the bottom of the valley portion. Therefore, the collision force and noise at the detent mechanism 20 can be suppressed.

A speed reduction mechanism 42 is provided between the motor 40 and the output shaft 15. The driven torque of the speed reduction mechanism 42 is larger than the torque that moves the detent roller 26 in the detent mechanism 20 toward the valley portions 211 and 212. As a result, the detent roller 26 is stopped before the bottom of the valley portion in a state of eliminating the backlash without reaching the bottom of the valley portion, so that the switching angle can be reduced and the responsiveness can be improved. Moreover, it is not necessary to supply power to stop the detent roller 26 at a location other than the bottom of the valley portion, so power consumption can be suppressed. Furthermore, swinging of the detent roller 26 when the power supply to the motor 40 is turned off can be suppressed.

Second Embodiment

Figure 6:
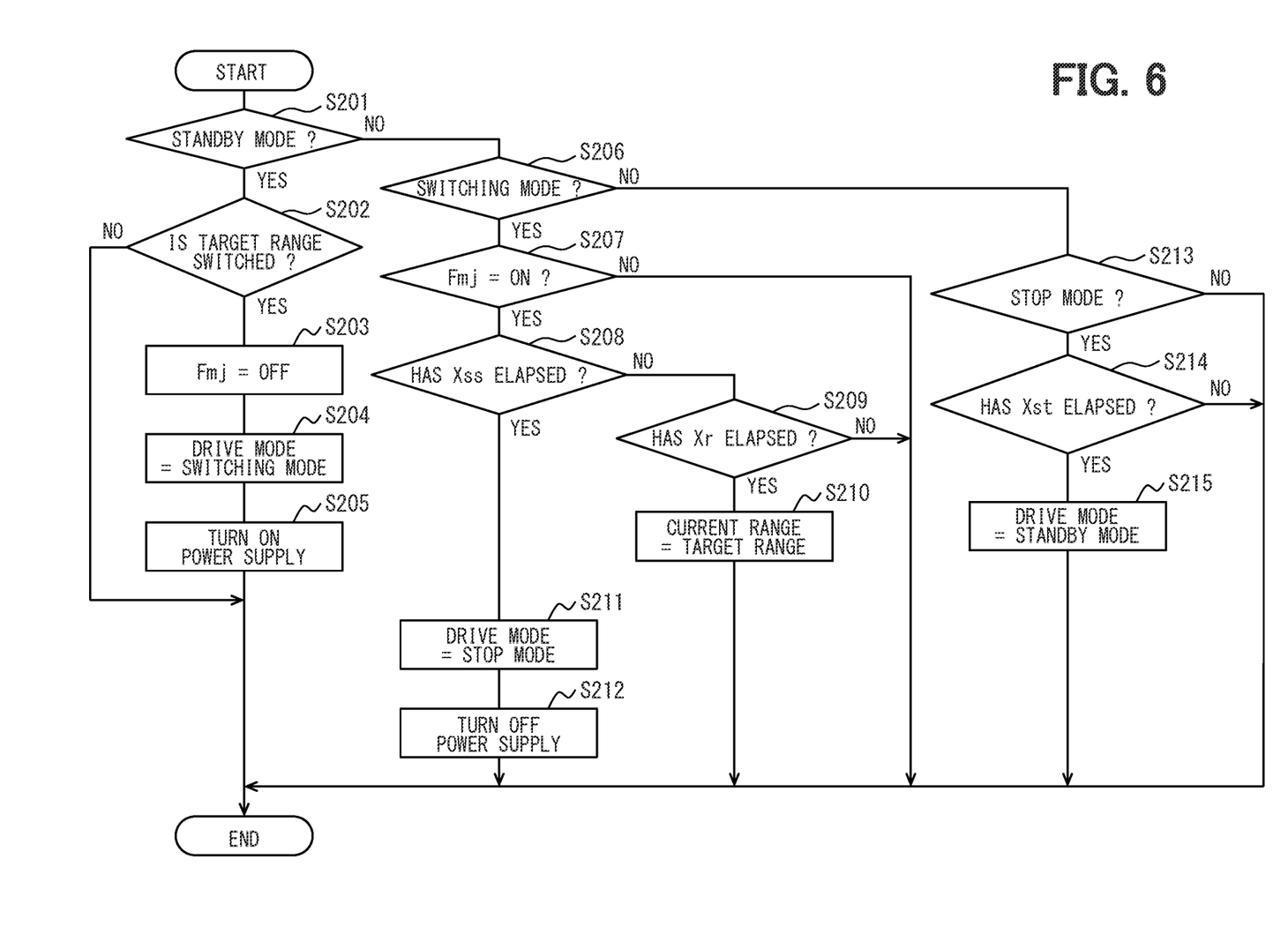
FIG. 6 is a flowchart for explaining the switching processing according to a second embodiment.
Figure 7:
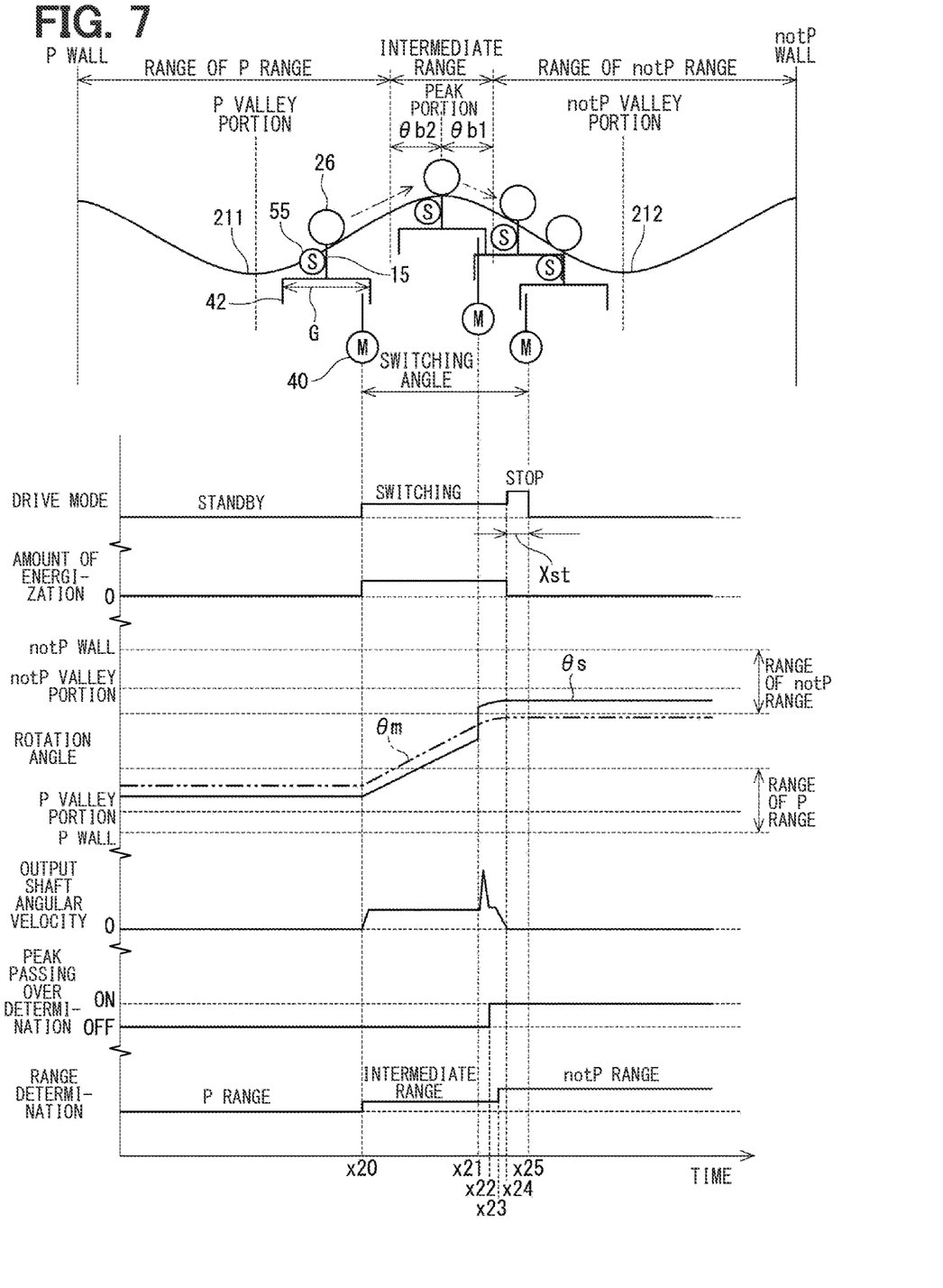
FIG. 7 is a schematic diagram and a time chart for explaining the switching processing according to the second embodiment.

A second embodiment will be described based on FIGS. 6 and 7. Since the second and third embodiments differ from the above-described embodiments in switching processing, the switching processing will be mainly described. The switching processing of the present embodiment will be described based on the flowchart of FIG. 6. The processes of S201 to S207 are the same as the processes of S101 to S107 in FIG. 4.

When it is determined that the peak passing over determination flag Fmj is ON (YES in S207), the process proceeds to S208. In S208, the position determination part 73 determines whether or not the stop transition time Xss has elapsed since the peak passing over determination flag was turned on. The stop transition time Xss is set according to the time from when the detent roller 26 passes over the peak portion 215 to when the stop control is started. When it is determined that the stop transition time Xss has elapsed (YES in S208), the process proceeds to S211. When it is determined that the stop transition time Xss has not elapsed (YES in S208), the stop transition counter that counts the elapsed time from turning on the peak passing over determination flag Fmj is incremented, and the process proceeds to S209.

In S209, the range determination part 74 determines whether or not the range determination standby time Xr has elapsed since the peak passing over determination flag was turned on. The range determination standby time Xr is the time from when the detent roller 26 passes over the peak portion 215 to when the range determination is performed, and is set shorter than the stop transition time Xss. That is, the relationship is Xr<Xss. When it is determined that the range determination standby time Xr has not elapsed (NO in S209), the range determination counter that counts the elapsed time after the peak passing over determination flag Fmj is turned on is incremented. When it is determined that the range determination standby time Xr has elapsed (YES in S209), the process proceeds to S210, and the current range is set as the target range.

When it is determined that the stop transition time Xss has elapsed (YES in S208), the process proceeds to S211 and S212. In S211 and S212, the control unit 70 sets the drive mode to the stop mode and turns off the power supply to the motor 40. The processes of S213 to S215 are the same as the processes of S111 to S113 in FIG. 4.

The switching processing of the present embodiment will be described based on the time chart of FIG. 7. The processing from time x20 to time x21 is the same as that from time x10 to time x11 in FIG. 5. At time x22, when the peak passing over determination flag Fmj is turned on, the range determination counter and the stop transition counter start timing.

At time x23, after the range determination waiting time Xr has passed, the range determination is set to the notP range. At time x24, when the stop transition time Xss elapses, the mode is shifted to the stop mode. The processing after shifting to the stop mode is the same as in FIG. 5. In the present embodiment, as compared with the first embodiment, the detent roller 26 stops at the position where it has moved toward the bottom of the valley portion due to the stop transition time Xss.

In the present embodiment, the range determination part 74 determines that the current range is the target range after the range determination standby time Xr has elapsed from the peak passing over determination timing. The drive control part 75 starts stop control to stop the motor 40 after the stop transition time Xss has elapsed from the peak passing over determination timing. As a result, switching to the target range can be reliably performed.

In addition, the same effects as those of the above embodiment can be obtained.

Third Embodiment

Figure 8:
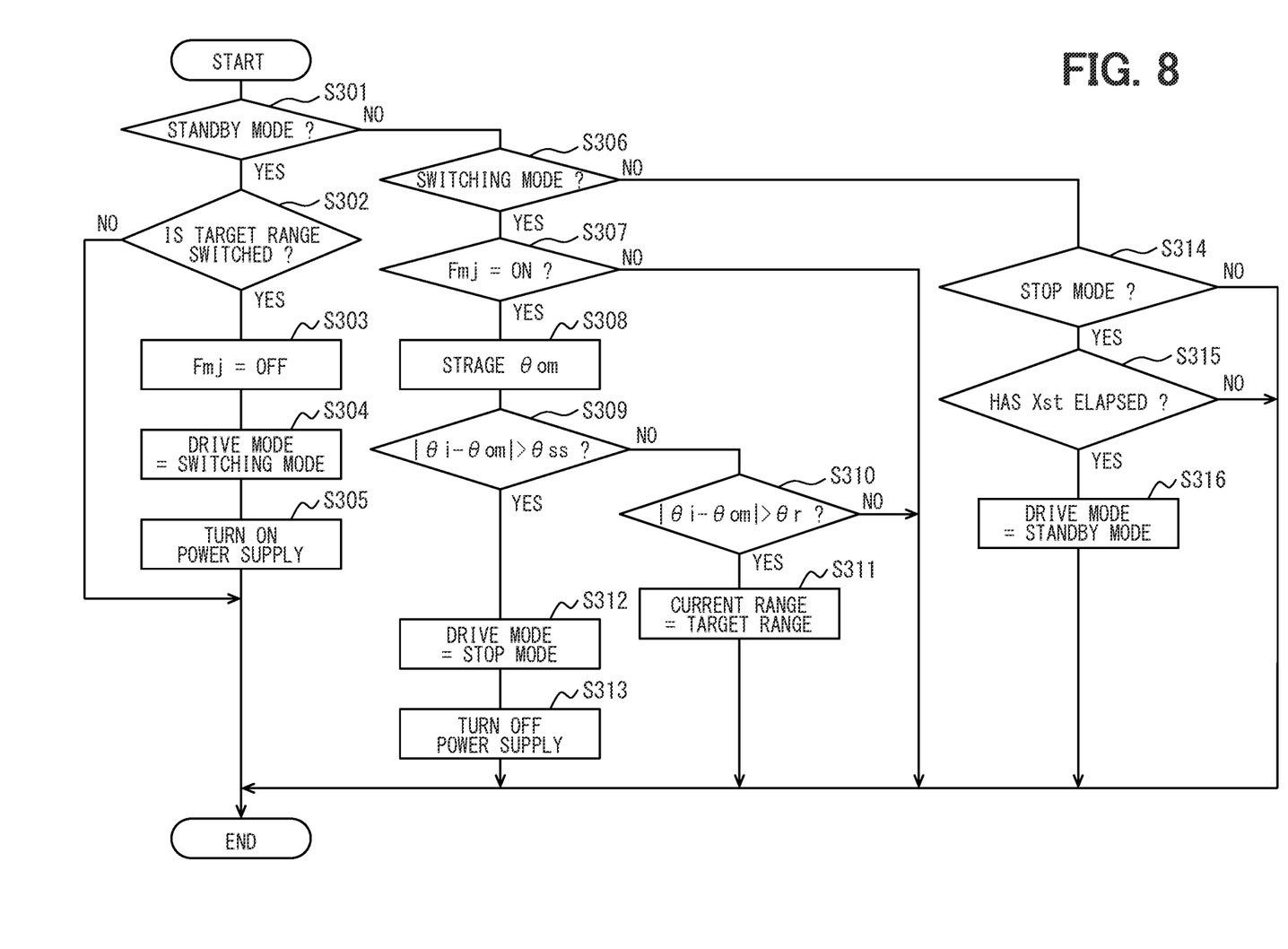
FIG. 8 is a flowchart for explaining the switching processing according to a third embodiment.

A third embodiment will be described with reference to FIG. 8. The switching processing of the present embodiment will be described based on the flowchart in FIGS. 8. S301 to S307 are the same as the processes of S101 to S107 in FIG. 4.

When it is determined that the peak passing over determination flag Fmj is ON (YES in S307), the process proceeds to S308. In S308, the control unit 70 stores the initial sensor angle θs when it is determined that the peak passing over determination flag Fmj is on as a peak passing over angle θom. If the peak passing over angle θom is already stored, that value is retained.

In S309, the control unit 70 determines whether the absolute value of the difference between the current angle θi, which is the current sensor angle θs, and the peak passing over angle θom is greater than the stop transition angle θss. The stop transition angle θss is set based on the stop position at which the detent roller 26 is stopped. When it is determined that the absolute value of the difference between the current angle θi and the peak passing over angle θom is greater than the stop transition angle θss (YES in S309), the process proceeds to S312. When it is determined that the absolute value of the difference between the current angle θi and the peak passing over angle θom is equal to or less than the stop transition angle θss (No in S309), the process proceeds to S310.

In S310, the range determination part 74 determines whether or not the absolute value of the difference between the current angle θi and the peak passing over angle θom is greater than the range determination standby angle θr. The range determination standby angle θr is set according to the range determination position for performing the range determination. When it is determined that the absolute value of the difference between the current angle θi and the peak passing over angle θom is equal to or less than the range determination standby angle θr (No in S310), S311 is skipped. When it is determined that the absolute value of the difference between the current angle θi and the peak passing over angle θom is greater than the range determination standby angle θr (YES in S310), the process proceeds to S311 and the current range is set as the target range.

When it is determined that the absolute value of the difference between the current angle θi and the peak passing over angle θom is greater than the stop transition angle θss (YES in S309), the process proceeds to S312 and S313. In S312 and S313, the control unit 70 sets the drive mode to the stop mode and turns off power supply to the motor 40. The processes of S314 to S316 are the same as the processes of S111 to S113 in FIG. 4.

In the present embodiment, the timing of range determination and the timing of transition to the stop mode are determined based on the sensor angle θs instead of the elapsed time. Except for this point, the time chart is substantially the same as that of the second embodiment.

In the present embodiment, the range determination part 74 determines that the current range is the target range after the detection value of the position sensor 55 capable of detecting the position of the output shaft 15 changes by the range determination standby angle θr from the peak passing over determination timing. The position sensor 55 is not limited to one that directly detects the position of the output shaft 15, and includes one that detects a detection target that can be converted by a shaft, a gear ratio, or the like connected to the output shaft 15. The drive control part 75 starts the stop control to stop the motor 40 after the detection value of the position sensor 55 changes by the stop transition angle θss from the peak passing over determination timing. As a result, switching to the target range can be reliably performed. In addition, the same effects as those of the above embodiment can be obtained.

Fourth Embodiment

Figure 9:
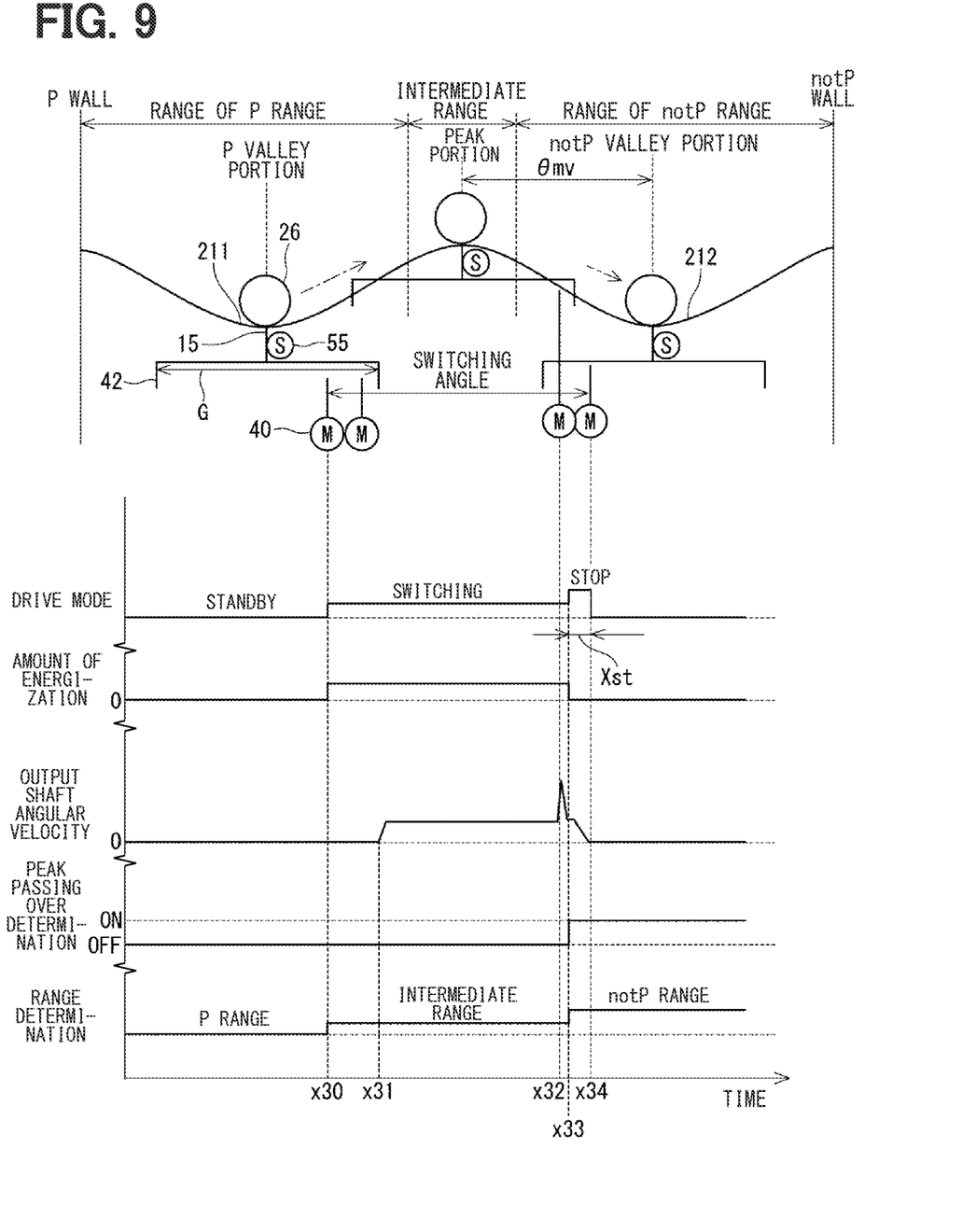
FIG. 9 is a schematic diagram and a time chart for explaining the switching processing according to a fourth embodiment.

A fourth embodiment is shown in FIG. 9. FIG. 9 shows a schematic diagram showing the drive state of the detent mechanism 20 in the upper row and a time chart in the lower row. The detection items are the same as those in FIG. 5 except that the rotation angle is omitted in the time chart. Also, the switching processing is the same as in the first embodiment.

In the present embodiment, the backlash G is set to be larger than the peak-to-valley angle θmv between the peak portion 215 and the bottom of the valley portions 211 and 212. When the target shift range is switched from the P range to the not P range at time x30, the motor 40 is driven, and at time x31 when the backlash is eliminated in the traveling direction, the drive of the output shaft 15 is started.

At time x32, when the detent roller 26 passes over the peak portion 215, the output shaft 15 moves within the range of the backlash G, and the detent roller 26 drops down to the bottom of the valley portion 212. At this time, the detent roller 26 falls to the bottom of the valley portion before the backlash is eliminated on the opposite side, so it is possible to prevent the occurrence of impact and collision noise inside the electric actuator 10. Further, the motor shaft rotates within the range of backlash G from when the detent roller 26 passes over the peak portion 215 to when the stop control is started. The stop control is performed from time x33 at which it is determined that the detent roller 26 has passed over the peak portion 215 to time x34 at which the stop determination time Xst elapses.

In the present embodiment, the total play provided between the motor 40 and the output shaft 15 is formed to be greater than or equal to the peak-to-valley angle θmv, which is the angle between the peak of the peak portion 215 and the bottom of the valley portions 211 and 212. As a result, it is possible to suppress the impact force and abnormal noise generated inside the electric actuator 10 when the detent roller 26 passes over the peak portion 215. Also, even if the stop control is started at the peak passing over timing, the detent roller 26 can be stopped at the bottommost portion of the valley portions 211 and 212. In addition, the same effects as that of the embodiment described above can be obtained.

Fifth Embodiment

Figure 10:
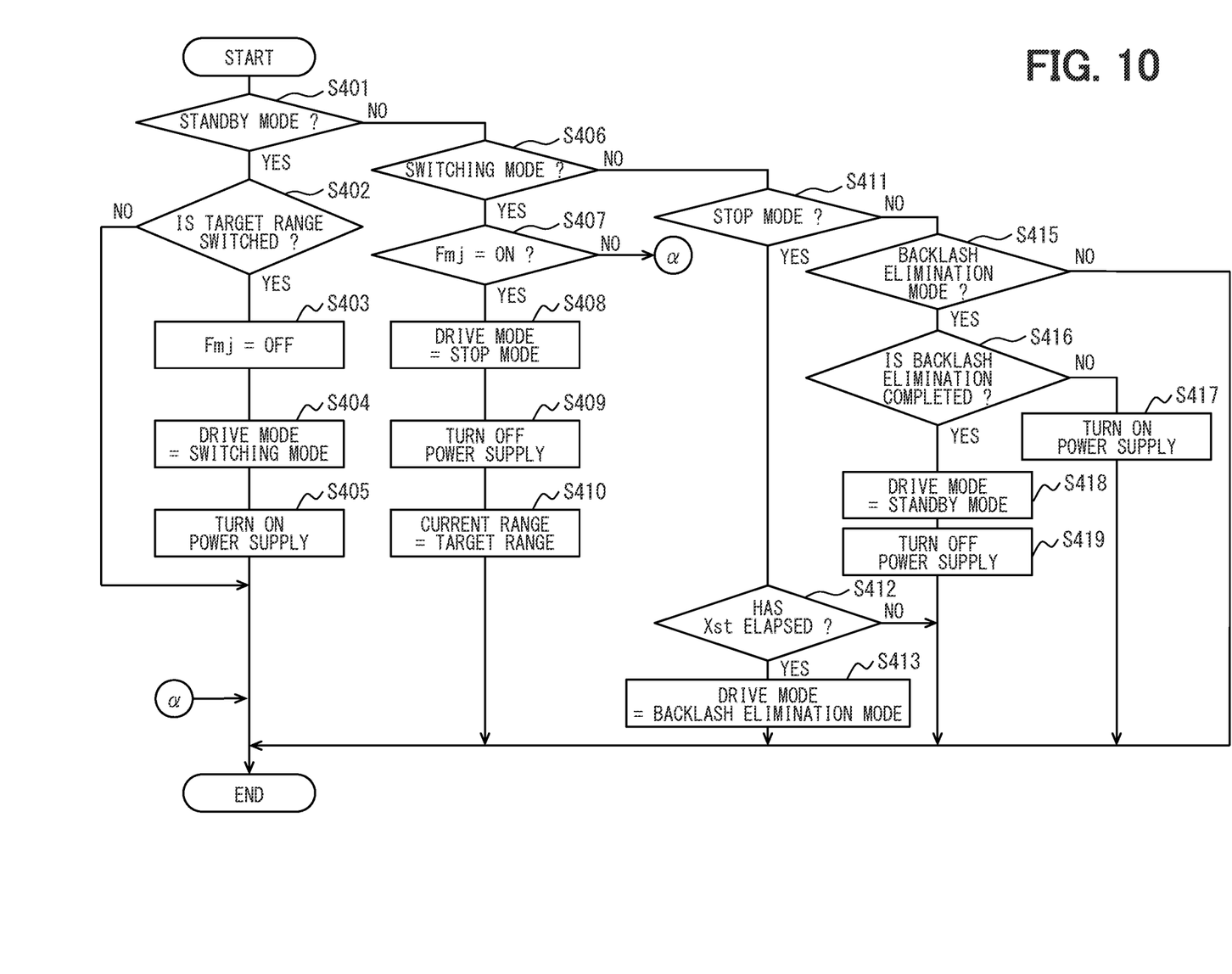
FIG. 10 is a flowchart for explaining the switching processing according to a fifth embodiment.
Figure 11:
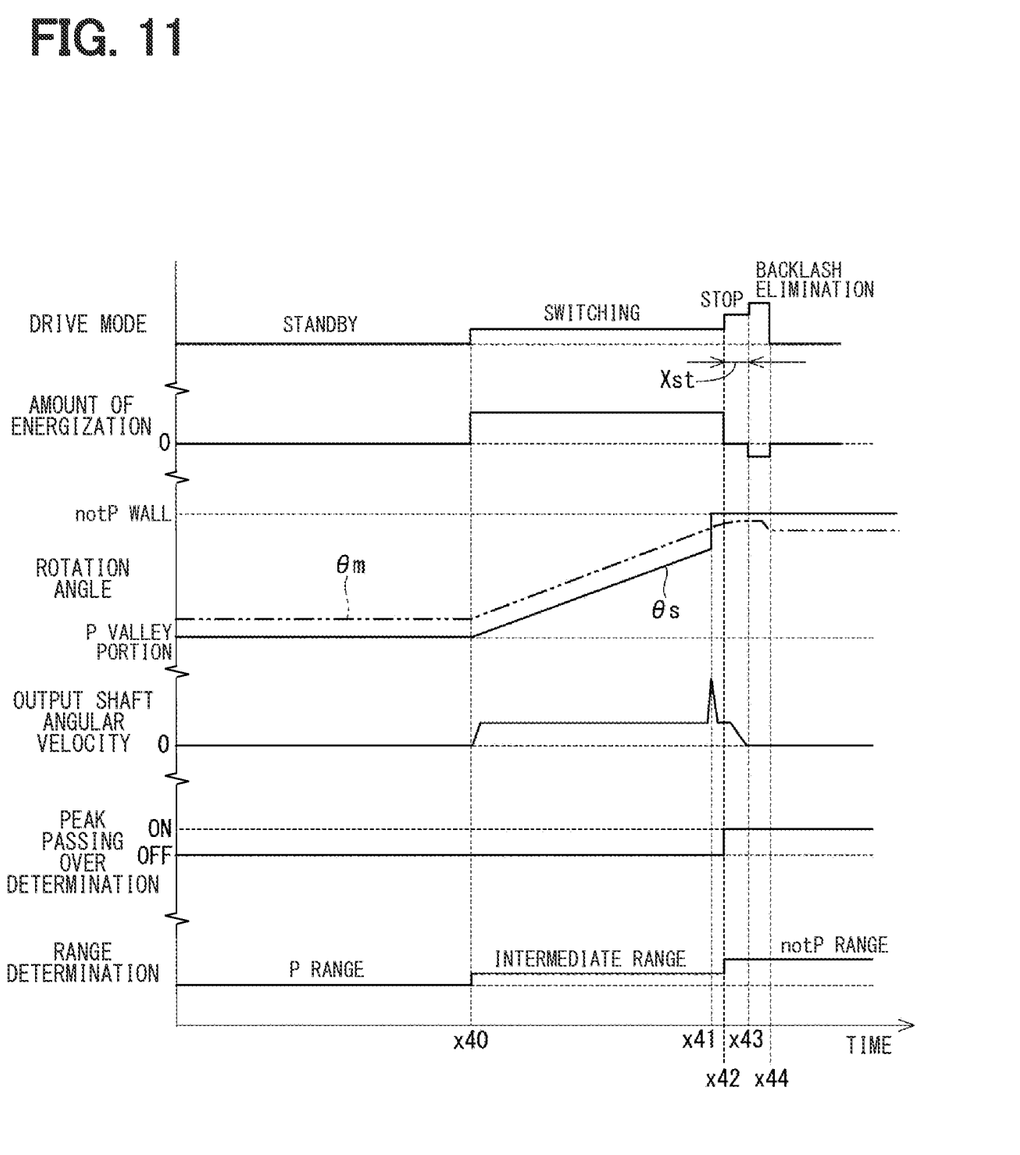
FIG. 11 is a time chart for explaining the switching processing according to the fifth embodiment.

A fifth embodiment is shown in FIGS. 10 and 11. In the detent mechanism 20 of the present embodiment, as in the fourth embodiment, the backlash G is formed to be larger than the peak-to-valley angle θmv. The switching processing of the present embodiment will be described based on the flowchart of FIG. 10. The processes of S401 to S410 are the same as the processes of S101 to S110 in FIG. 4.

In S411 to which the drive mode is determined not to be the switching mode (NO in S406), the control unit 70 determines whether or not the drive mode is the stop mode. When it is determined that the drive mode is the stop mode (YES in S411), the process proceeds to S412, and when it is determined that the drive mode is not the stop mode (NO in S411), the process proceeds to S415.

Figure 4:
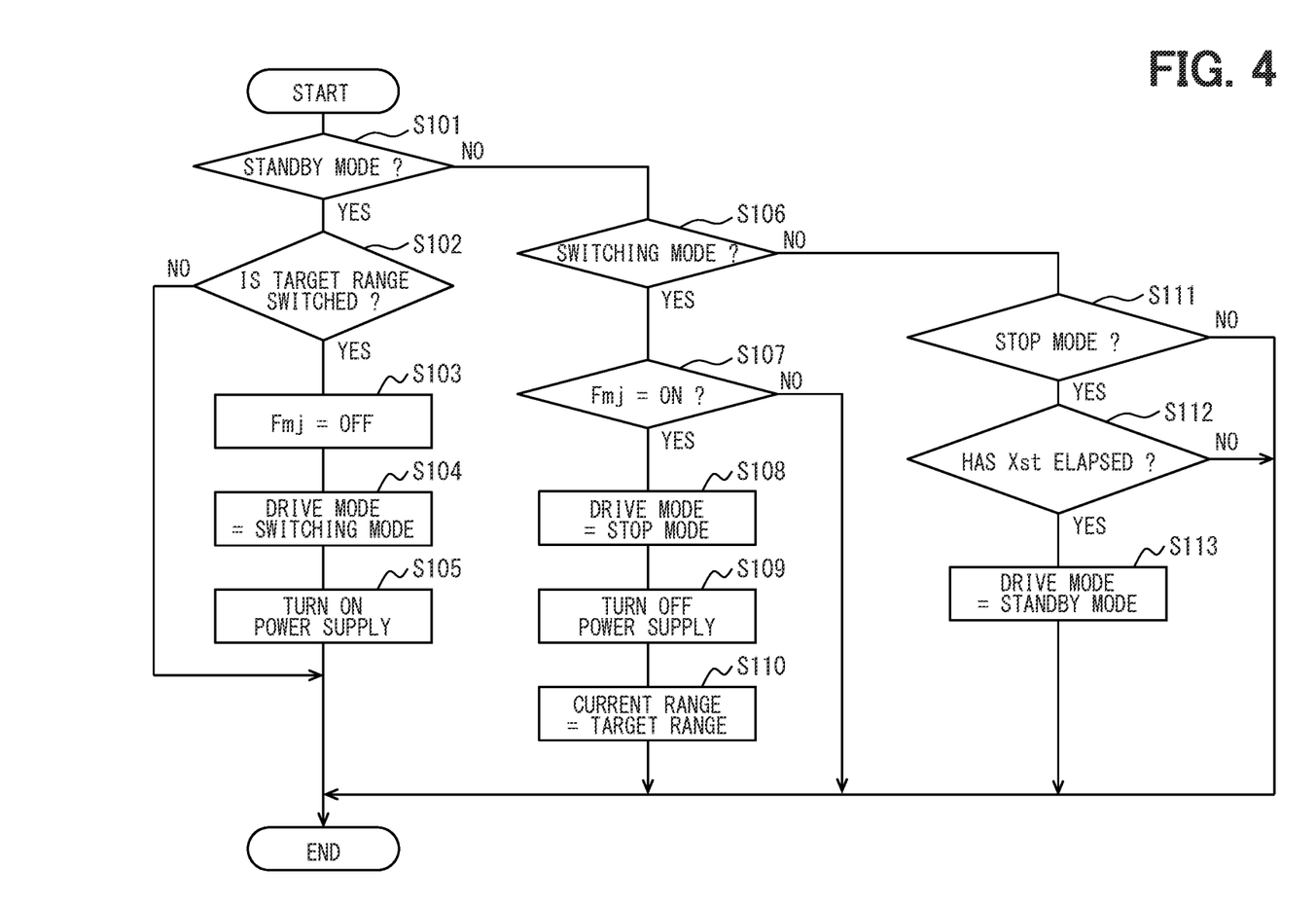
FIG. 4 is a flowchart for explaining a switching processing according to the first embodiment.

The process of S412 is the same as the process of S112 in FIG. 4, and when it is determined that the stop determination time Xst has not elapsed (NO in S412), the stop control counter is incremented. When it is determined that the stop determination time Xst has passed (YES in S412), the process proceeds to S413, and the drive mode is set to the backlash elimination mode. It also resets the stop control counter.

In S415 to which the drive mode is determined not to be the switching mode (NO in S411), the control unit 70 determines whether or not the drive mode is the backlash elimination mode. When it is determined that the drive mode is not the backlash elimination mode (NO in S415), the processes after S416 are skipped. When it is determined that the drive mode is the backlash elimination mode (YES in S415), the process proceeds to S416.

In S416, the control unit 70 determines whether or not the backlash elimination control has been completed. When it is determined that the backlash elimination control has not been completed (NO in S416), the process proceeds to S417, the power supply to the motor 40 is turned on, and the backlash elimination control is performed. When the backlash elimination control is in progress, that state is continued. In the backlash elimination control, for improving the responsiveness at the time of switching next range, when switching the range, the motor 40 is driven in the opposite direction. When the current range is the not P range, the backlash is eliminated on the P range side, and when the current range is the P range, the backlash is eliminated on the not P range side. When it is determined that the backlash elimination control has been completed (YES in S416), the process proceeds to S418, the drive mode is set to the standby mode, and the power supply to the motor 40 is turned off in S419.

The switching control of the present embodiment will be described based on the time chart of FIG. 11. In FIG. 11, the common time axis is taken as the horizontal axis, and from the top, the drive mode, the amount of energization, the rotation angle, the output shaft angular velocity, the peak passing over determination flag Fmj, and the range determination are shown.

At time x40, when the target shift range switches from the P range to the notP range, the drive mode is changed from the standby mode to the switching mode, and the motor 40 is driven. Here, since backlash elimination control is performed at the time of the previous switching, the output shaft 15 is driven substantially simultaneously with the start of driving the motor 40, and the detent roller 26 moves toward the peak of the peak portion 215. Also, the range determination is set from the P range to the intermediate range.

At time x41, when the detent roller 26 passes over the peak portion 215, the torque reverses, and the output shaft 15 moves within the range of backlash G, so that the detent roller 26 moves to the bottom of the valley portion 212. At time x42, the peak passing over determination flag Fmj is turned on, the drive mode is changed to the stop mode, and the power supply to the motor 40 is turned off.

At the time x43 when the stop determination time Xst has elapsed from the start of the stop mode, the drive mode is changed to the backlash elimination mode, and the motor 40 is energized to drive in the direction opposite to that at the time of switching. As a result, the output shaft 15 is moved to the P range side, which is the traveling direction side at the time of switching next range, within the range of the backlash G. At time x44, the backlash elimination control is completed and the power supply to the motor 40 is turned off.

In the present embodiment, after the end of switching the range, the backlash elimination control is performed to drive the motor 40 in the direction opposite to that at the time of switching, within the range of play between the motor 40 and the output shaft 15. Thereby, responsiveness can be improved. In addition, the same effects as those of the above embodiment can be obtained.

In the embodiment, the parking lock system 1 corresponds to "drive system", the electric actuator 10 corresponds to "actuator", the detent plate 21 corresponds to "detent member", the detent roller 26 corresponds to "engaging member", the motor 40 corresponds to "drive source", the control Device 60 corresponds to "actuator control device". Also, the sensor rotation speed Ns corresponds to "drive change rate". Further, the range determination standby angle θr corresponds to "range determination standby amount", the stop transition angle Ess corresponds to "stop transition amount", and the backlash elimination control corresponds to "return control".

Other Embodiments

In the above embodiments, the speed reduction mechanism is composed of a worm gear, a helical gear, an intermediate gear, and the like. In other embodiments, the configuration of the speed reduction mechanism and the number of speed reduction stages may differ from those of the above embodiments. In the above embodiments, the drive source is a brushed DC motor. In other embodiments, the drive source may be a motor other than a brushed DC motor, and may be a solenoid, or the like. Although the electric actuator is of the rotary type in the above embodiment, it may be of the direct acting type in other embodiments.

In the above embodiments, the electric actuator is applied to a parking lock system. In other embodiments, the electric actuator may be applied to in-vehicle systems other than parking lock systems or drive systems other than in-vehicle systems.

The control unit and the technique according to the present disclosure may be achieved by a dedicated computer provided by constituting a processor and a memory programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An actuator control device in a drive system including an actuator having a drive source, and a detent mechanism having a plurality of valley portions and a peak portion separating the valley portions, and an engaging member movable between the valley portions when an output shaft is driven by the actuator and that controls switching of a shift range by driving the actuator and moving the engaging member, comprising
    a drive control part configured to control a drive of the actuator;
    a position determination part configured to determine, based on sensor information, that the engaging member passes over the peak portion when moving the engaging member to a target valley portion corresponding to a target range; and
    a range determination part configured to estimate that the engaging member reaches a range of the target range corresponding to the target range at a peak passing over determination timing, which is the timing at which it is determined that the engaging member passes over the peak portion.

2. The actuator control device according to claim 1, wherein
    the range determination part determines that a current range is the target range at the peak passing over determination timing, and
    the drive control part starts a stop control for stopping the actuator at the peak passing over determination timing.

3. The actuator control device according to claim 1, wherein
    the range determination part determines that a current range is the target range after a range determination standby time has elapsed from the peak passing over determination timing, and
    the drive control part starts a stop control for stopping the actuator after a stop transition time has elapsed from the peak passing over determination timing.

4. The actuator control device according to claim 1, wherein
    the range determination part determines that a current range is the target range after a detection value of a position sensor configured to detect a position of the output shaft changes by a range determination standby amount from the peak passing over determination timing, and
    the drive control part starts a stop control for stopping the actuator after the detection value of the position sensor changes by a stop transition amount from the peak passing over determination timing.

5. The actuator control device according to claim 1, wherein
    a total play provided between the drive source and the output shaft is formed to be larger than an angle between the peak of the peak portion and a range of range determination, and is formed to be smaller than an angle between the peak of the peak portion and a bottom of the valley portion.

6. The actuator control device according to claim 5, wherein
    a speed reduction mechanism is provided between the drive source and the output shaft, and a driven torque of the speed reduction mechanism is larger than the torque for moving the engaging member toward the valley portion side in the detent mechanism.

7. The actuator control device according to claim 1, wherein
a total play provided between the drive source and the output shaft is larger than or equal to an angle between a peak of the peak portion and a bottom of the valley portion.

8. The actuator control device according to claim 7, wherein
after range switching is completed, the drive control part performs a return control to drive the actuator in a direction opposite to that at a time of switching within a range of play between the drive source and the output shaft.

9. A method of controlling switching of a shift range by driving an actuator and moving an engaging member in a drive system including an actuator having a drive source, and a detent mechanism having a plurality of valley portions and a peak portion separating the valley portions, and an engaging member movable between the valley portions when an output shaft is driven by the actuator, comprising
controlling a drive of the actuator;
determining, based on sensor information, that the engaging member passes over the peak portion when moving the engaging member to a target valley portion corresponding to a target range; and
estimating that the engaging member reaches a range of the target range corresponding to the target range at a peak passing over determination timing, which is the timing at which it is determined that the engaging member passes over the peak portion.

10. An actuator control device in a drive system including an actuator having a drive source, and a detent mechanism having a plurality of valley portions and a peak portion separating the valley portions, and an engaging member movable between the valley portions when an output shaft is driven by the actuator and that controls switching of a shift range by driving the actuator and moving the engaging member, comprising
a computer including a processor and a memory that stores instructions configured to, when executed by the processor, cause the processor to
control a drive of the actuator;
determine, based on sensor information, that the engaging member passes over the peak portion when moving the engaging member to a target valley portion corresponding to a target range; and
estimate that the engaging member reaches a range of the target range corresponding to the target range at a peak passing over determination timing, which is the timing at which it is determined that the engaging member passes over the peak portion.

* * * * *